US008010357B2

(12) United States Patent
Hakkani-Tur et al.

(10) Patent No.: US 8,010,357 B2
(45) Date of Patent: Aug. 30, 2011

(54) COMBINING ACTIVE AND SEMI-SUPERVISED LEARNING FOR SPOKEN LANGUAGE UNDERSTANDING

(75) Inventors: Dilek Z. Hakkani-Tur, Denville, NJ (US); Robert Elias Schapire, Princeton, NJ (US); Gokhan Tur, Denville, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1142 days.

(21) Appl. No.: 11/033,902

(22) Filed: Jan. 12, 2005

(65) Prior Publication Data

US 2009/0063145 A1 Mar. 5, 2009

Related U.S. Application Data

(60) Provisional application No. 60/549,240, filed on Mar. 2, 2004.

(51) Int. Cl.
*G10L 15/06* (2006.01)
(52) U.S. Cl. .............. 704/244; 704/9; 704/10; 704/243; 704/245; 704/257; 706/12
(58) Field of Classification Search ........... 704/E15.012, 704/E15.013, E15.008, 9–10, 243–245, 257; 706/12
See application file for complete search history.

(56) References Cited

U.S. PATENT DOCUMENTS

| | | | |
|---|---|---|---|
| 6,208,963 B1 * | 3/2001 | Martinez et al. | 704/232 |
| 6,314,399 B1 * | 11/2001 | Deligne et al. | 704/257 |
| 7,149,687 B1 * | 12/2006 | Gorin et al. | 704/243 |
| 7,490,071 B2 * | 2/2009 | Milenova et al. | 706/45 |
| 7,835,910 B1 * | 11/2010 | Hakkani-Tur et al. | 704/243 |
| 2003/0083859 A1 | 5/2003 | Murata | |
| 2003/0233369 A1 * | 12/2003 | Sassano | 707/102 |
| 2004/0205482 A1 * | 10/2004 | Basu et al. | 715/500.1 |
| 2005/0105712 A1 * | 5/2005 | Williams et al. | 379/265.02 |
| 2005/0182736 A1 * | 8/2005 | Castellanos | 705/80 |

OTHER PUBLICATIONS

G. Tur et al. "Active and Semi-Supervised Learning for Spoken Language Understanding" Aug. 7, 2003.*
Jin, R., & Si, L. (2004). A bayesian approach toward active learning for collaborative filtering. Proceedings of the 20th conference on Uncertainty in artificial intelligence (pp. 278-285). Banff, Canada: AUAI Press.*
S. Tong and D. Koller. Active learning for parameter estimation in Bayesian networks. In NIPS, pp. 647{653, 2000.*
S. Tong and D. Koller. Active learning for structure in Bayesian networks. In Proc. IJCAI-01, 2001.*
D. Hakkani-Tiir, G. Riccardi, and A. Gorin, "Active learning for automatic speech recognition," in Proceedings of the ICASSP, 2002.*
[Baram et al., 2003] Y. Baram, R. El-Yaniv, and K. Luz. Online choice of active learning algorithms. In Proc. of ICML-2003, pp. 19-26, 2003.*
McCallum, A. & Nigam, K. (1998) "Employing EM in Pool-Based Active Learning", in ICML98.*

(Continued)

*Primary Examiner* — Richemond Dorvil
*Assistant Examiner* — Greg Borsetti (57) ABSTRACT

Combined active and semi-supervised learning to reduce an amount of manual labeling when training a spoken language understanding model classifier. The classifier may be trained with human-labeled utterance data. Ones of a group of unselected utterance data may be selected for manual labeling via active learning. The classifier may be changed, via semi-supervised learning, based on the selected ones of the unselected utterance data.

25 Claims, 8 Drawing Sheets

OTHER PUBLICATIONS

Tur et al. "Active Labeling for Spoken Language Understanding" 2003.*

Schapire et al. "BoosTexter: A Boosting-based System for Text Categorization" 2000.*

Schapire et al. "Incorporating Prior Knowledge into Boosting" 2002.*

McCallum, Andrew et al "Employing EM in Pool-Based Active Learning for Text Classification". 15$^{th}$ International Conference on Machine Learning (ICML-98). Mar. 1998.

Tür, Gokhan et al. "Active Learning for Spoken Language Understanding". © 2003 IEEE. AT&T Labs—Research, Florham Park, New Jersey, USA.

Tür, Gokhan et al. "Exploiting Unlabeled Utterances for Spoken Language Understanding". Eurospeech 2003—Geneva. AT&T Labs—Research, Florham Park, New Jersey, USA.

Musela, Ion et al. "Active + Semi-Supervised Learning = Robust Multi-View Learning". Information Sciences Institute / University of Southern California, Marina del Rey, California, USA.

Riccardi, Giuseppe et al. "Active and Unsupervised Learning for Automatic Speech Recognition". AT&T Labs—Research, Florham Park, New Jersey, USA.

Robert E. Shapire, "The boosting approach to machine learning: An overview", Proceeding of the MSRI Workshop on Nonlinear Estimation and Classification, 2002, pp. 1-23.

G. Tur et al., "Combining active and semi-supervised learning for spoken language understanding", Speech Communication, Elsevier Science Publishers, Amsterdam, NL, vol. 45, No. 2, Feb. 2005, pp. 171-186.

X. Zhu et al., "Combining active learning and semi-supervised learning using Gaussian Fields and Harmonic Functions", Proceedings of the ICML 2003, Workshop on the Continuum from Labeled to Unlabeled Data, Aug. 21, 2003.

Musela, Ion et al., "Active + Semi-Supervised Learning = Robust Multi-View Learning", Information Sciences Institute/University of Southern California, Marina del Rey, California, USA, Jul. 2002.

Riccardi, Giuseppe et al., "Active and Unsupervised Learning for Automatic Speech Recognition", AT&T Labs—Research, Florham Park, New Jersey, USA, Sep. 2003.

* cited by examiner

- Given training data from the instance space
  $X = \{(x_1, Y_1), ..., (x_m, Y_m)\}$ where $x_i \in X$ and $Y_i \subseteq \gamma$.
- Initialize the distribution $D_1(i,l) = \frac{1}{mk}$
- For each iteration $t = 1, ..., T$ do
  - Train a base learner, $h_t$, using distribution $D_t$.
  - Update
  $$D_{t+1}(i,l) = \frac{D_t(i,l) = e^{-\alpha_t Y_i[l] h_t(x_i,l)}}{Z_t}$$
  where $Z_t$ is a normalization factor an $\alpha_t$ is the weight of the base learner.
- Then the output of the final classifier is defined as:
  $$H(x,l) = sign(f(x,l))$$
  where
  $$f(x,l) = \sum_{t=1}^{T} \alpha_t h_t(x,l)$$

COMBINING ACTIVE AND SEMI-SUPERVISED LEARNING FOR SPOKEN LANGUAGE UNDERSTANDING

This application benefits from U.S. Provisional Application 60/549,240, filed on Mar. 2, 2004, the contents of which are herein incorporated by reference in its entirety.

BACKGROUND OF THE INVENTION

1. Field of the Invention

The present invention relates to speech recognition and more specifically to call classification of speech for spoken language systems.

2. Introduction

An objective of spoken dialog systems is to identify a speaker's intent, expressed in natural language, and take actions accordingly, to satisfy the intent. In a natural spoken dialog system, a speaker's utterance may be recognized using an automatic speech recognizer (ASR). The speaker's intent may be identified from a recognized sequence of words in the utterance by using a spoken language understanding (SLU) component. Identifying the speaker's intent may be framed as a classification problem for goal-oriented call routing systems. As a call classification example, consider the utterance "I would like to know my account balance," in a customer care application. Assuming that the utterance is recognized correctly, the corresponding intent or the call-type would be Request(Account Balance) and the action would be learning the account number and prompting the balance to the user or routing this call to the Billing Department.

When statistical classifiers are used in such systems, they may be trained using large amounts of task data which is usually transcribed and then labeled (assigning one or more predefined call-type(s) to each utterance) by humans. This is a very expensive and labor-intensive process. The bottleneck in building an accurate statistical system is the time spent labeling in order to have high quality labeled data.

Typically, examples to be labeled are chosen randomly so that the training data matches the test set. In machine learning literature, learning from randomly selected examples is called passive learning. Recently, a new set of learning algorithms, in which a learner acts on the examples to be labeled, have been proposed. These new learning algorithms are called active learning. Using active learning, it is possible to get better performances using a subset of the training data.

The goal of active learning is to reduce a number of training examples to be labeled by selectively sampling a subset of the unlabeled data. This may be done by inspecting the unlabeled examples, and selecting the most informative ones with respect to a given cost function for human labeling. In other words, the goal of active learning algorithms is to select examples which will result in the largest increase in performance, and thereby reduce the human labeling effort. Selectively sampling utterances assumes that there is a pool of candidate utterances to label, which is much more than the capacity of the labelers. In a deployed natural dialog system, this is indeed the case, where a constant stream of raw data is collected from the field to continuously improve the performance of the system. Then the aim of active learning is to derive a smaller subset of all utterances collected from the field for human labeling.

A complimentary problem involves knowing how to intelligently exploit the remaining set of utterances that are not labeled by a human. Techniques for building better call classification systems in a shorter time frame are desired.

SUMMARY OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

In a first aspect of the invention, a method for training a spoken language understanding model classifier is provided. The classifier may be trained with human-labeled utterance data. Ones of a group of unselected utterance data may be selected, via active learning, for manual labeling. The classifier may be changed, via semi-supervised learning, based on the selected ones of the unselected utterance data.

In a second aspect of the invention, a machine-readable medium, having instructions recorded therein is provided. The instructions may include a set of instructions for training a classifier with human-labeled utterance data, a set of instructions for selecting, via active learning, ones of a plurality of unselected unlabeled utterance data for manual labeling, and a set of instructions for changing the classifier, via semi-supervised learning, based on the selected ones of the unselected unlabeled utterance data.

In a third aspect of the invention, a system is provided. The system may include at least one processor and storage to hold a group of instructions and data for use by the at least one processor. The at least one processor may be configured to train a model with human-labeled utterance, select, via active learning, ones of a group of unselected utterance data for manual labeling, and change the model, via semi-supervised learning, based on the selected ones of the unselected utterance data to produce an updated model.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Spoken Dialog Systems

Figure 1:
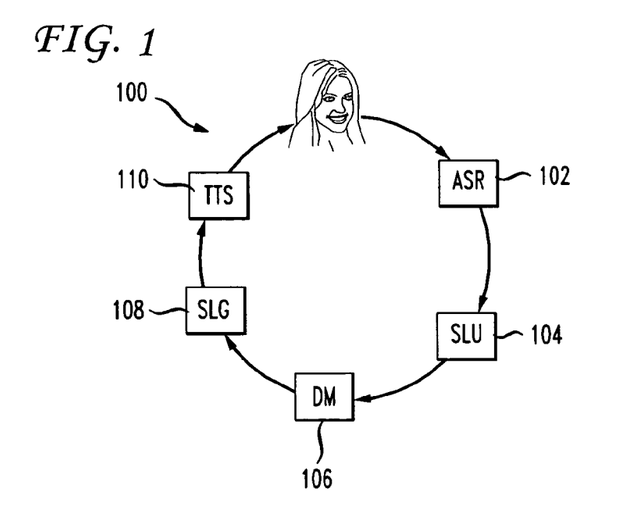
FIG. 1 illustrates an exemplary spoken language dialog system consistent with principles of the invention.

FIG. 1 is a functional block diagram of an exemplary natural language spoken dialog system 100 consistent with the principles of the invention. Natural language spoken dialog system 100 may include an automatic speech recognition (ASR) module 102, a spoken language understanding (SLU) module 104, a dialog management (DM) module 106, a spoken language generation (SLG) module 108, and a text-to-speech (TTS) module 110.

ASR module 102 may analyze speech input and may provide a transcription of the speech input as output. SLU module 104 may receive the transcribed input and may use a natural language understanding model to analyze the group of words that are included in the transcribed input to derive a meaning from the input. One way that this may be done is by analyzing the group of words in the transcribed input in order to assign a label or call-type to the group of words. Thus, SLU module 104 may include a classifier for assigning the label or the call-type to the group of words. DM module 106 may receive the meaning or intent of the speech input from SLU module 104 and may determine an action, such as, for example, providing a spoken response, based on the input. SLG module 108 may generate a transcription of one or more words in response to the action provided by DM module 106. TTS module 110 may receive the transcription as input and may provide generated audible speech as output based on the transcribed speech.

Thus, the modules of system 100 may recognize speech input, such as speech utterances, may transcribe the speech input, may identify (or understand) the meaning of the transcribed speech, may determine an appropriate response to the speech input, may generate text of the appropriate response and from that text, generate audible "speech" from system 100, which the user then hears. In this manner, the user can carry on a natural language dialog with system 100. Those of ordinary skill in the art will understand the programming languages and means for generating and training ASR module 102 or any of the other modules in the spoken dialog system. Further, the modules of system 100 may operate independent of a full dialog system. For example, a computing device such as a smartphone (or any processing device having a phone capability) may have an ASR module wherein a user may say "call mom" and the smartphone may act on the instruction without a "spoken dialog."

FIG. 1 is an exemplary spoken dialog system. Other spoken dialog systems may include other types of modules and may have different quantities of various modules.

Figure 2:
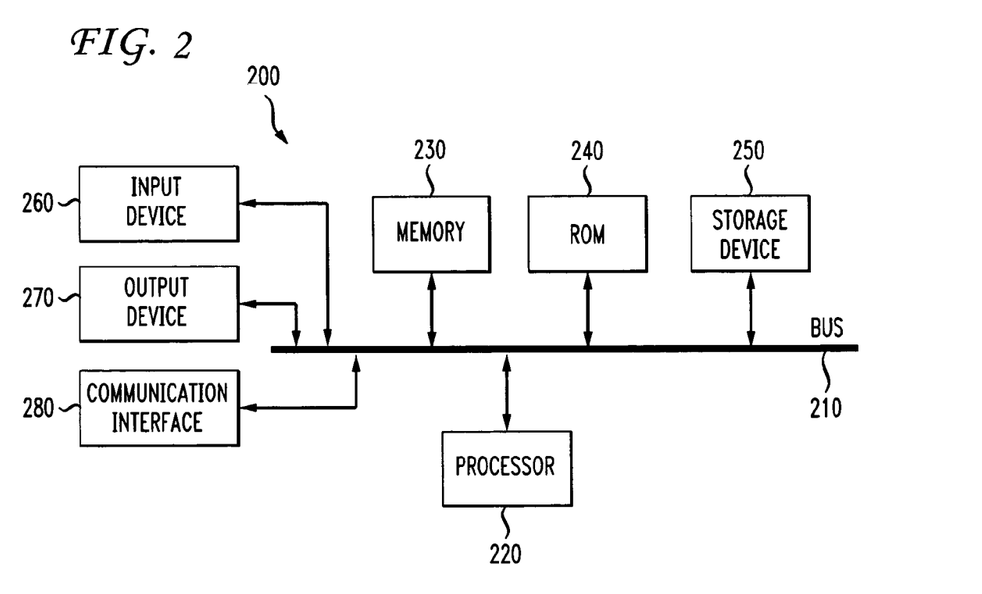
FIG. 2 illustrates an exemplary system which may be used to implement a spoken language dialog system.

FIG. 2 illustrates an exemplary processing system 200 in which one or more of the modules of system 100 may be implemented. Thus, system 100 may include at least one processing system, such as, for example, exemplary processing system 200. System 200 may include a bus 210, a processor 220, a memory 230, a read only memory (ROM) 240, a storage device 250, an input device 260, an output device 270, and a communication interface 280. Bus 210 may permit communication among the components of system 200.

Processor 220 may include at least one conventional processor or microprocessor that interprets and executes instructions. Memory 230 may be a random access memory (RAM) or another type of dynamic storage device that stores information and instructions for execution by processor 220. Memory 230 may also store temporary variables or other intermediate information used during execution of instructions by processor 220. ROM 240 may include a conventional ROM device or another type of static storage device that stores static information and instructions for processor 220. Storage device 250 may include any type of media, such as, for example, magnetic or optical recording media and its corresponding drive.

Input device 260 may include one or more conventional mechanisms that permit a user to input information to system 200, such as a keyboard, a mouse, a pen, a voice recognition device, etc. Output device 270 may include one or more conventional mechanisms that output information to the user, including a display, a printer, one or more speakers, or a medium, such as a memory, or a magnetic or optical disk and a corresponding disk drive. Communication interface 280 may include any transceiver-like mechanism that enables system 200 to communicate via a network. For example, communication interface 180 may include a modem, or an Ethernet interface for communicating via a local area network (LAN). Alternatively, communication interface 180 may include other mechanisms for communicating with other devices and/or systems via wired, wireless or optical connections.

System 200 may perform functions in response to processor 220 executing sequences of instructions contained in a computer-readable medium, such as, for example, memory 230, a magnetic disk, or an optical disk. Such instructions may be read into memory 230 from another computer-readable medium, such as storage device 250, or from a separate device via communication interface 280.

Boosting

Boosting has been used to combine "weak" base classifiers to produce a "strong" classifier. The boosting algorithm may be iterative and, in each iteration, a weak classifier may be learned so as to minimize training error.

Figure 3:
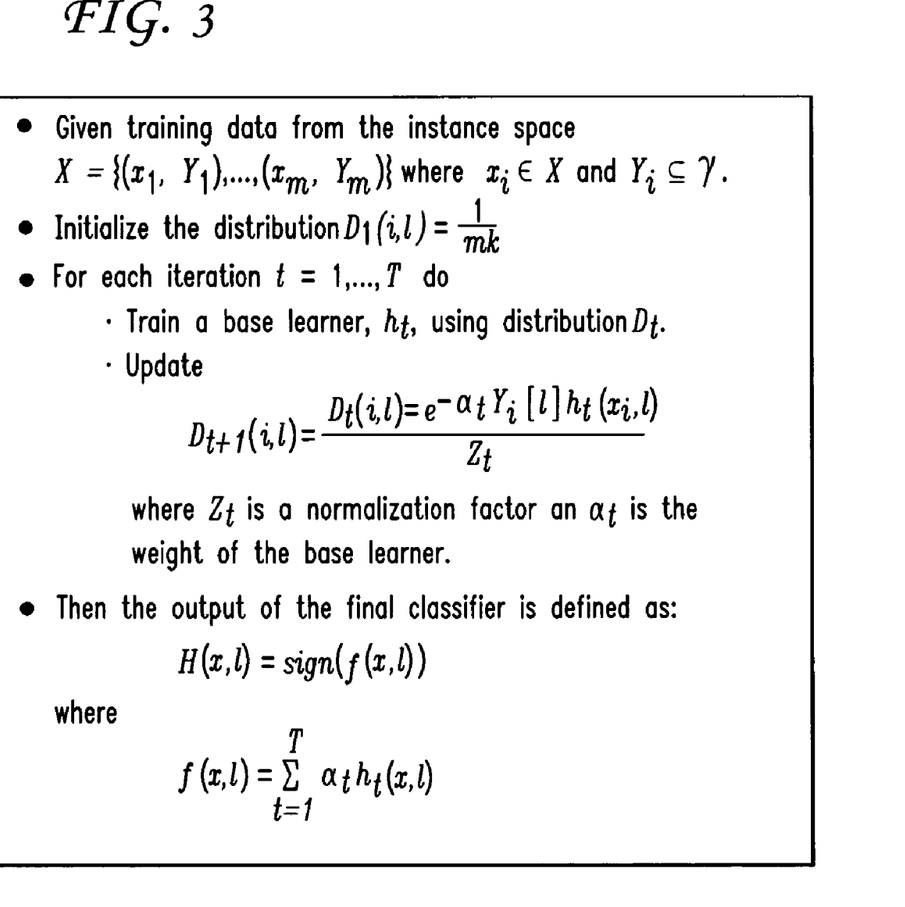
FIG. 3 illustrates an exemplary process including a boosting-style algorithm.

The algorithm, generalized for multi-class and multi-label classification, is shown in FIG. 3. Let X denote the domain of possible training examples and let Y be a finite set of classes of size $|y|=k$. For $Y \subseteq y$, let $Y[l]$ for $l \in y$ be $$Y[l] = \begin{cases} +1, & \text{if } l \in Y \\ -1, & \text{otherwise} \end{cases}$$

The algorithm may begin by initializing a uniform distribution, $D_1(i,l)$, over training examples, i, and labels, l. After each round, this distribution may be updated so that example-class combinations, which are easier to classify get lower weights and vice versa. An intended effect is to force the weak learning algorithm to concentrate on examples and labels that will be the most beneficial to the overall goal of finding a highly accurate classification rule.

Instead of just a raw real-valued classification score, it is possible to estimate the probability of a particular class using a logistic function:

$$Pr(Y[l] = +1 \mid x) = \frac{1}{1 + e^{-2 \times f(x,l)}}$$

This algorithm can be seen as a procedure for finding a linear combination of base classifiers which attempts to minimize an exponential loss function. The exponential loss function may be:

$$\sum_i \sum_l e^{-Y_i[l]f(x_i,l)}$$

An alternative would be minimizing a logistic loss function, which may be:

$$\sum_i \sum_l \ln(1 + e^{-Y_i[l]f(x_i,l)})$$

In such a case the logistic function used to get the probabilities can be computed as:

$$Pr(Y[l] = +1 \mid x) = \frac{1}{1 + e^{-f(x,l)}}$$

A more detailed explanation and analysis of this algorithm can be found in "The boosting approach to machine learning: An overview," *Proceedings of the MSRI Workshop on Nonlinear Estimation and Classification*, Berkely, Calif., by R. E. Schapire, March 2001, which is herein incorporated by reference in its entirety.

Active Learning: Selection of Data to Label

In implementations consistent with the principles of the invention, utterances are selected for labeling that the classifier is least confident about.

Figure 4:
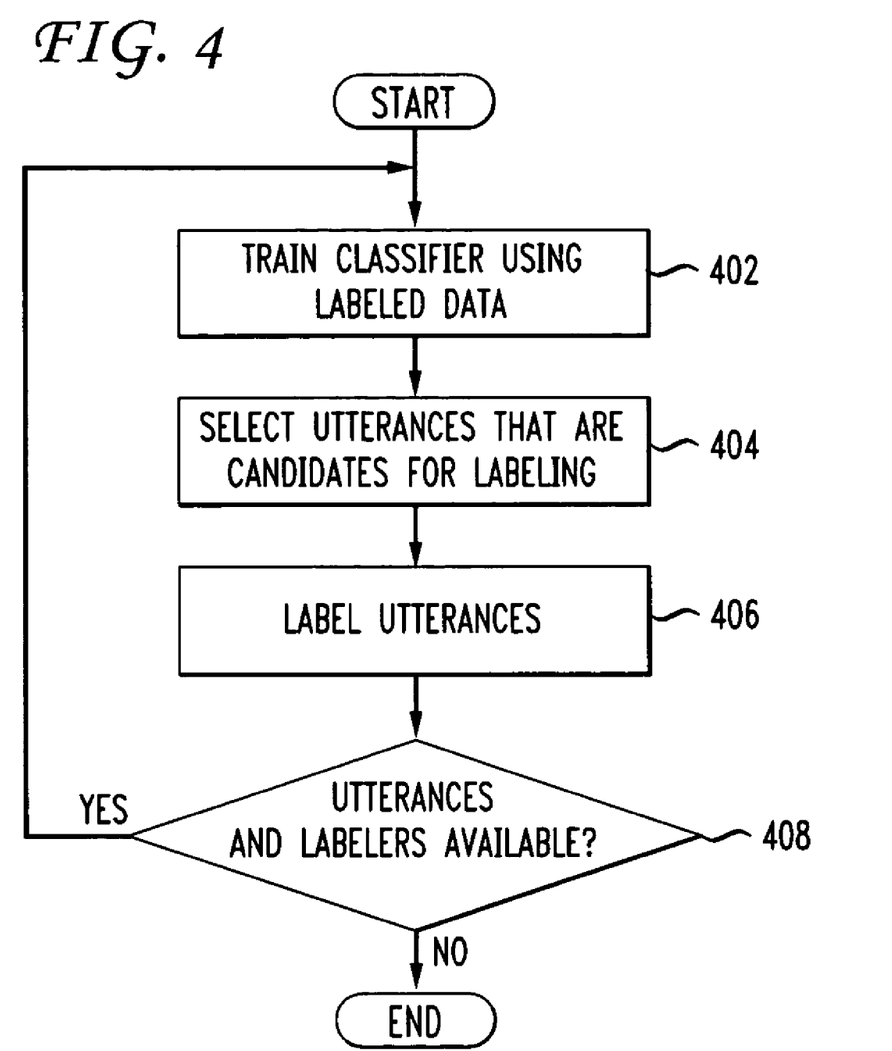
FIG. 4 is a flowchart that illustrates an active learning method.

FIG. 4 describes exemplary processing, consistent with the principles of the invention, for performing active learning. First, a classifier may be trained using a small set of human-labeled data, $S_t$ (act 402). Next, the classifier may select utterances, from the unlabeled data, $S_t$, as candidates for labeling (act 404). This may be done by using the classifier to classify the utterances that are candidates for labeling, $S_p = \{s_1, \ldots s_n\}$ and then using the confidence score for the top scoring call-type, $CS(s_i)$, for each utterance $s_i \in S_p$ to predict which candidates are misclassified:

$$CS(s_i) = \max_{c_j} CS_{c_j}(s_i)$$

where $CS_{c_j}(s_i)$ is the confidence score assigned by the classifier to utterance $s_i$ for the call-type $c_j$ $$CS_{c_j}(s_i) = Pr(Y[j] = +1 \mid S_i)$$

The utterances having the lowest confidence scores (for example, a score lower than th) may then be manually labeled:

$$S_k = \{s_i : CS(s_i) < th\} \quad \text{(act 406)}$$

A check may be performed to determine whether additional utterances are available that have not been manually transcribed and whether labelers are available (act 408). If so, then acts 402-408 may be repeated. Otherwise, the process may be completed.

This approach may be independent of the classifier used. The threshold, th, may be mainly determined by the capacity of the manual labeling effort or by the performance of the current classifier. In other implementations consistent with the principles of the invention, a different criterion for selecting the utterances for labeling may be used, such as, for example, a difference between the top two call-type confidence scores, or by using other call-type scores or all the call-type scores.

One other parameter of the process may be characteristics of the pool used by the process. For, example, instead of assuming a fixed pool, a dynamic pool may be used. A constant stream of incoming data traffic may better reflect an actual SLU system. In such a case, active learning may again select the most informative utterances from a given pool, as in the above algorithm. However, at each iteration, a new pool may be provided to the process. Thus, the above process may be updated to obtain a new set of unlabeled data, $S_p$, after manually labeling the selected utterances.

Note that the distribution of the call-types in the selectively sampled training data have skewed from their priors. That is, the distribution of call-types in the training data has become different from the distribution of call-types in the test data. Classes that have a larger number of examples in the training data or that may be easy to classify may be under-represented by selective sampling. In other words, the classifier trained on selectively sampled data may be biased to infrequent or hard to classify classes. Divergence from the priors may be a problem that may cause deterioration of the performance of the classifier. A novel solution to this problem is presented later in this specification.

Semi-Supervised Learning: Exploiting the Unlabeled Data

The goal of semi-supervised learning is to exploit unlabeled utterances in order to improve the performance of the classifier. Two methods are discussed which achieve this goal. Both methods assume that there is some amount of training data available for training an initial classifier. These methods use the classifier to label the unlabeled data automatically, and improve the classifier performance by using the machine-labeled call-types as the labels of those unlabeled utterances, thus reducing the amount of human-labeling needed to build better statistical classifiers.

Figure 5:
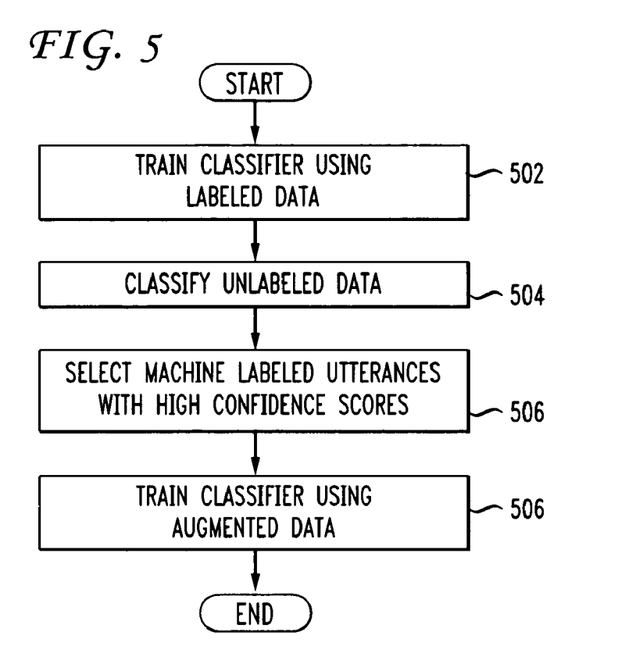
FIG. 5 is a flowchart that illustrates a semi-supervised learning method.

FIG. 5 illustrates one exemplary process that may be used in implementations consistent with the principles of the invention. First, an initial model may be trained using the human-labeled data (act 502), and then the unlabeled data may be classified by the trained classifier (act 504). Then the unlabeled utterances may be added directly to the training data, by using the machine-labeled call-types. In order to reduce the noise added because of classifier errors, those utterances which are classified with call-types having confidence scores greater than or equal to some threshold, th, may be selected (act 506).

$$S_m = \{s_i : CS(s_i) \geq th\}$$

where $$CS(s_i) = \max_{c_j} CS_{c_j}(s_i)$$

The classifier may then be trained using the augmented data (the selected data) (act 508).

It is then straightforward to use the call-types exceeding or equal to the threshold for each utterance during re-training.

$$Y_i[l] = \begin{cases} +1 : CS_{c_t}(s_i) \geq th \\ -1 : \text{otherwise} \end{cases}$$

The threshold, th, may be set by using a separate held-out set, which is not used for training. There may be a trade-off in selecting the threshold. If the threshold is set to a lower value, that means a larger amount of noisy data may be used. If the threshold is set to a higher value, that means less useful or informative data my be used.

Augmenting the Classification Model

Figure 6:
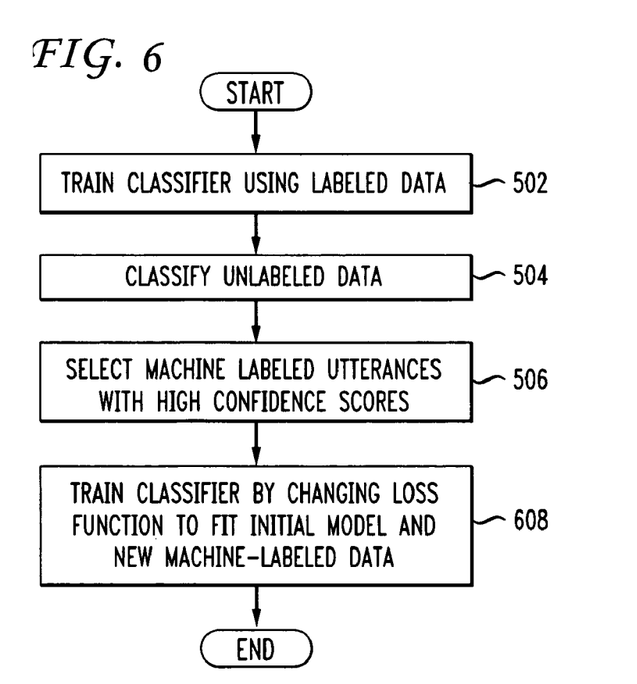
FIG. 6 is a flowchart that illustrates another semi-supervised learning method.

FIG. 6 illustrates another method that may be used in implementations consistent with the principles of the invention for semi-supervised learning. Acts 502-506 may be the same as in the method of FIG. 5. Then, the boosting algorithm may be used to try to fit both the machine-labeled data and the prior model using the following loss function:

$$\sum_i \sum_l (\ln(1 + e^{-Y_i[l] f(x_i, l)}) + \eta KL(Pr(Y_i[l] = +1 | x_i) \| \rho(f(x_i, l))))$$

where $$KL(p\|q) = p \times \ln\left(\frac{p}{q}\right) + (1-p) \times \ln\left(\frac{1-p}{1-q}\right)$$

is the Kullback-Leibler divergence (or binary relative entropy) between two probability distributions p and q (act 608). p and q may correspond to the distribution from the prior model, $P(Y_i[l]=+1|x_i)$, to the distribution from the constructed model, $\rho(f(x_i))$. This term is basically the distance from the initial model built by human-labeled data to the new model built with machine-labeled data. In a marginal case, if these two distributions are always the same then the KL term will be 0 and the loss function will be exactly the same as the first term, which is nothing but the logistic loss. η may be used to control the relative importance of these two terms. This weight may be determined empirically on a held-out set. Also, similar to the previously-discussed method, in order to reduce the noise added due to classifier errors, only those utterances which are classified with a confidence score higher than or equal to some threshold may be exploited.

One thing to note is that most classifiers support a way of combining models or augmenting an existing model. Although this implementation is classifier (Boosting) dependent, the idea may be more general. For example, a Naive Bayes classifier may be implemented as linear model interpolation.

The challenge with semi-supervised learning is that only the utterances which are classified with a confidence score larger than or equal to some threshold may be exploited in order to reduce the noise introduced by the classifier errors. Intuitively, the noise introduced would be decreased with better initial models, but in such a case, additional data would be less useful. So one may expect such semi-supervised techniques to work less well with very little or very large amounts of data. Instead of using a threshold to select machine-labeled data, in an alternative implementation, consistent with the principles of the invention, the classifier may be modified such that, at each iteration, the confidence scores of the call-types may contribute to the data distribution on a weighted basis. For example, one may assign a weight to each example based on the confidence of the top scoring call-type(s) given by the classifier trained with human-labeled data. Some classifiers can accept examples with weights. In such cases this may be a better solution than using a threshold.

Combining Active and Semi-Supervised Learning

Although the previous examples described particular active and semi-supervised learning methods, implementations consistent with the principles of the invention are not limited to only the methods disclosed in the examples. In fact, many different active learning methods and semi-supervised learning methods are well-known and may be used in various implementations.

Figure 7:
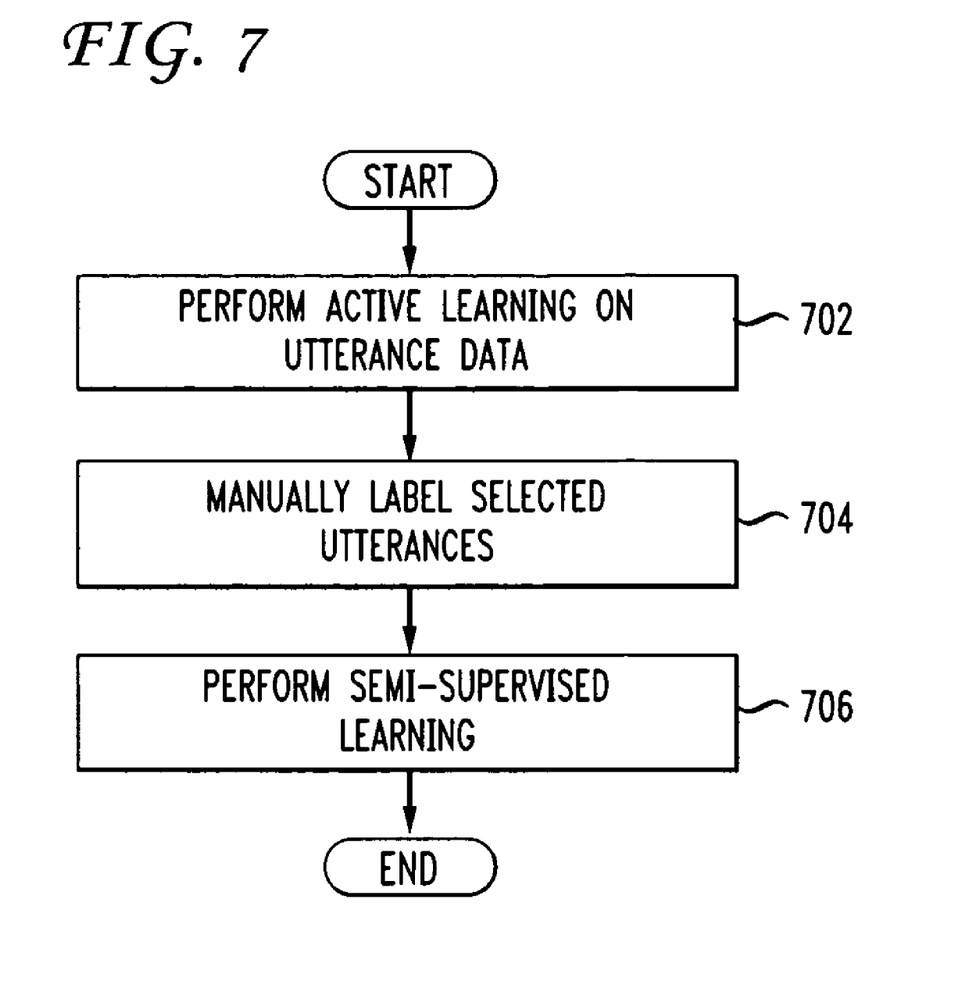
FIGS. 7-10 are flowcharts that illustrate combined active learning and semi-supervised methods consistent with the principles of the invention.

Implementations consistent with the principles of the invention may combine active and semi-supervised learning methods. FIG. 7 is a high-level flowchart that describes an exemplary combined active and semi-supervised learning method. The process may begin with training utterance data, which may include some amount of human-labeled utterances. Active learning may be performed on the utterance data (act 702). The active learning may select candidates for manual labeling. In some implementations consistent with the principles of the invention, the selected candidates may have been assigned a confidence score by a classifier. The confidence score of the selected candidates may be less than or equal to a lower threshold value. Next, human labelers may manually label the selected candidates (act 706). Semi-supervised learning may then be performed (act 708).

Figure 8:
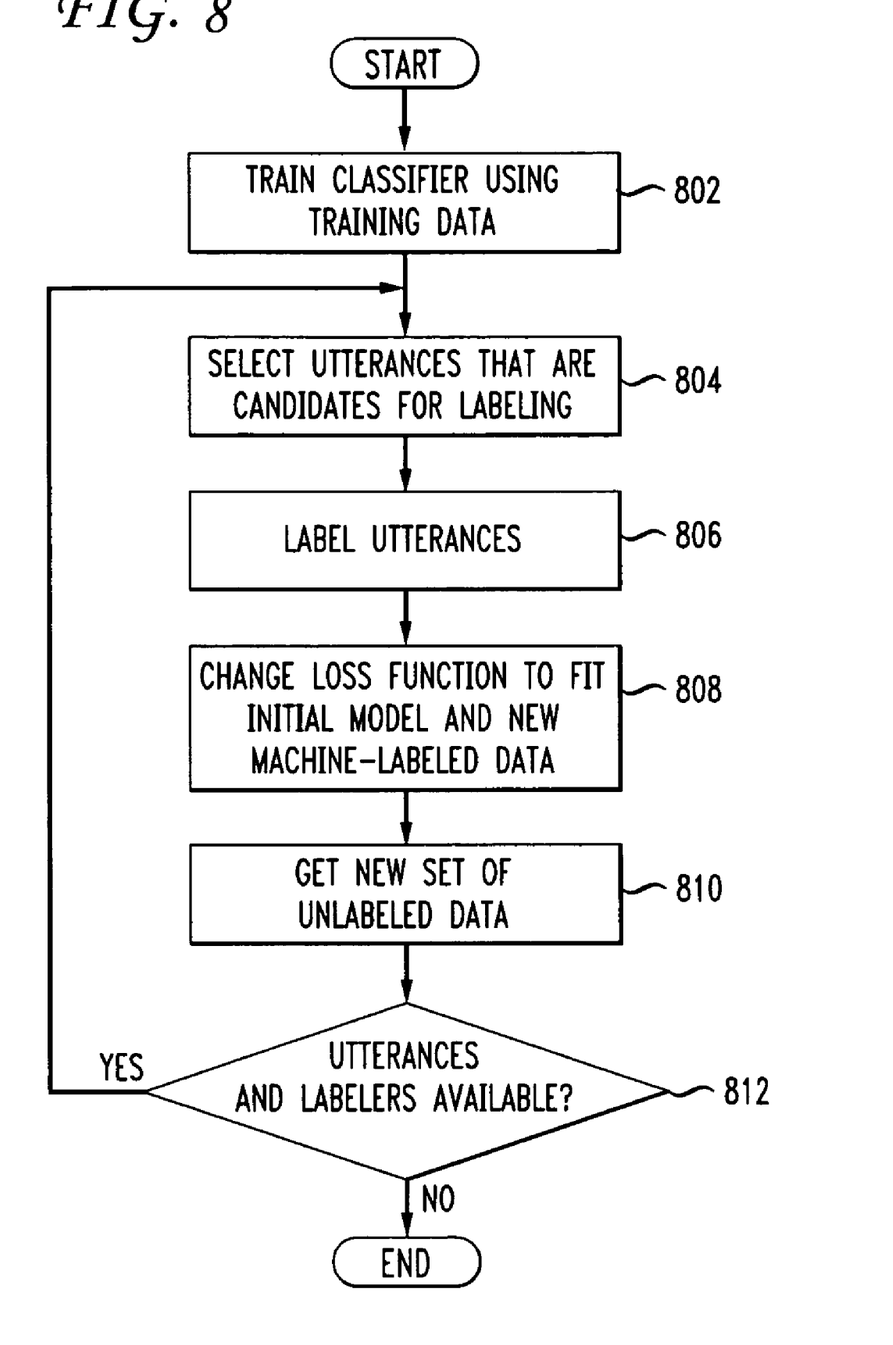

FIG. 8 is a flowchart of a more specific exemplary combined active and semi-supervised learning process that may be used in implementations consistent with the principles of the invention. Instead of leaving out the utterances classified with high confidence scores, this process may exploit them.

Note that in this process, instead of assuming a fixed pool, there is an assumption that there is a constant stream of incoming data, which may better reflect a real-life scenario. First, a classifier may be trained with some amount of human-labeled training data, $S_t$ (act 802). Then, utterances that are candidates for labeling may be selected (act 804). This may be achieved by classifying utterances in a pool of unlabeled data, $S_p=\{s_1, \ldots, s_n\}$, using the classifier to compute confidence scores and then selecting utterances, $S_k$, with confidence scores, $S_k=\{CS(s_i)<th\}$. The selected utterances may then be manually labeled (act 806). The classifier may then be augmented by changing the loss function to fit both the initial model and the new machine-labeled data (act 808). A new set of unlabeled data may be obtained (act 810) and a check may be performed to determine whether any unselected utterances are available and whether any labeling resources are available (act 812). If so, then acts 804-812 may be repeated. Otherwise, the process may be completed.

If manual labeling resources are scarce, one may introduce a second threshold to eliminate noise from unlabeled data. In other words, one threshold may be used for active learning and another threshold may be used for semi-supervised learning. Otherwise, combining active and semi-supervised learning may eliminate the need for the second threshold. Since the utterances, which are already classified with low confidence scores, may be selected by active learning and sent to a human for labeling, for semi-supervised learning the noise is already reduced. Therefore, it may not be necessary to find an optimal threshold with which to work if a ratio of the unlabeled data to labeled data is comparable.

As a variation to the exemplary process of FIG. 8, before performing act 808, the classifier may be retrained using human-labeled training data and then the unselected utterances, $S_u$, may be classified to obtain machine-labeled data. Using more selectively sampled data may result in better classification.

Figure 9:
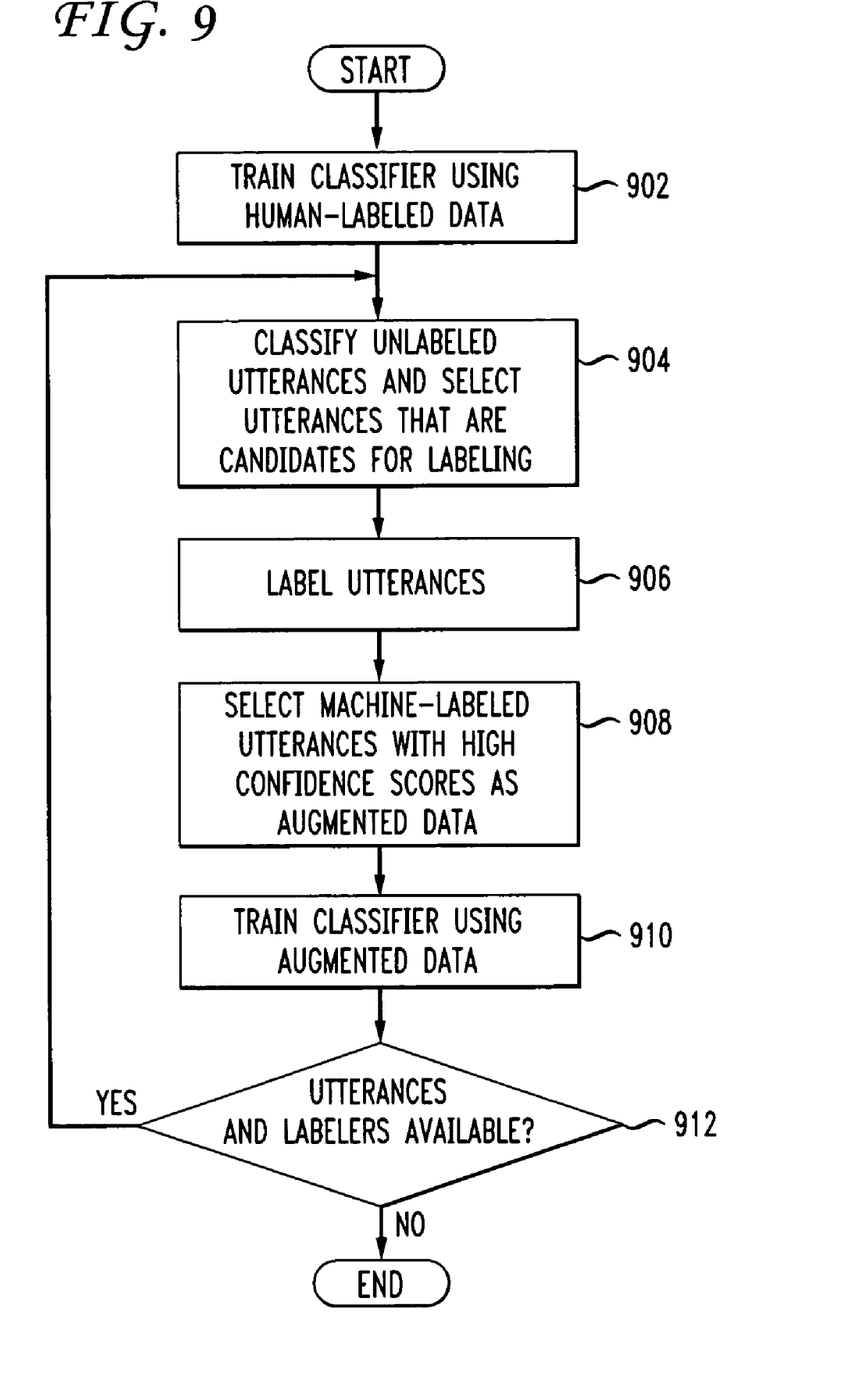

FIG. 9 is a is a flowchart of another specific exemplary combined active and semi-supervised learning process that may be used in implementations consistent with the principles of the invention as an alternative to the exemplary process of FIG. 8. First, an initial model may be trained using human-labeled data (act 902), and then the unlabeled data may be classified by the trained classifier. Machine-labeled utterances with a confidence score below a first threshold, $th_1$, may be selected as candidates for labeling (act 904). Then the candidates for labeling may be transcribed and manually labeled (act 906). The machine-labeled utterances having confidence scores higher than or equal to a threshold, $th_2$, may be added directly to the training data (act 908). The classifier may then be trained using the augmented data (the selected data) (act 910). A check may then be performed to determine whether any unselected and unlabeled utterances remain and whether any labeling resources are available (act 912). If so, acts 904-912 may be performed again. Otherwise, the process may be finished.

Figure 10:
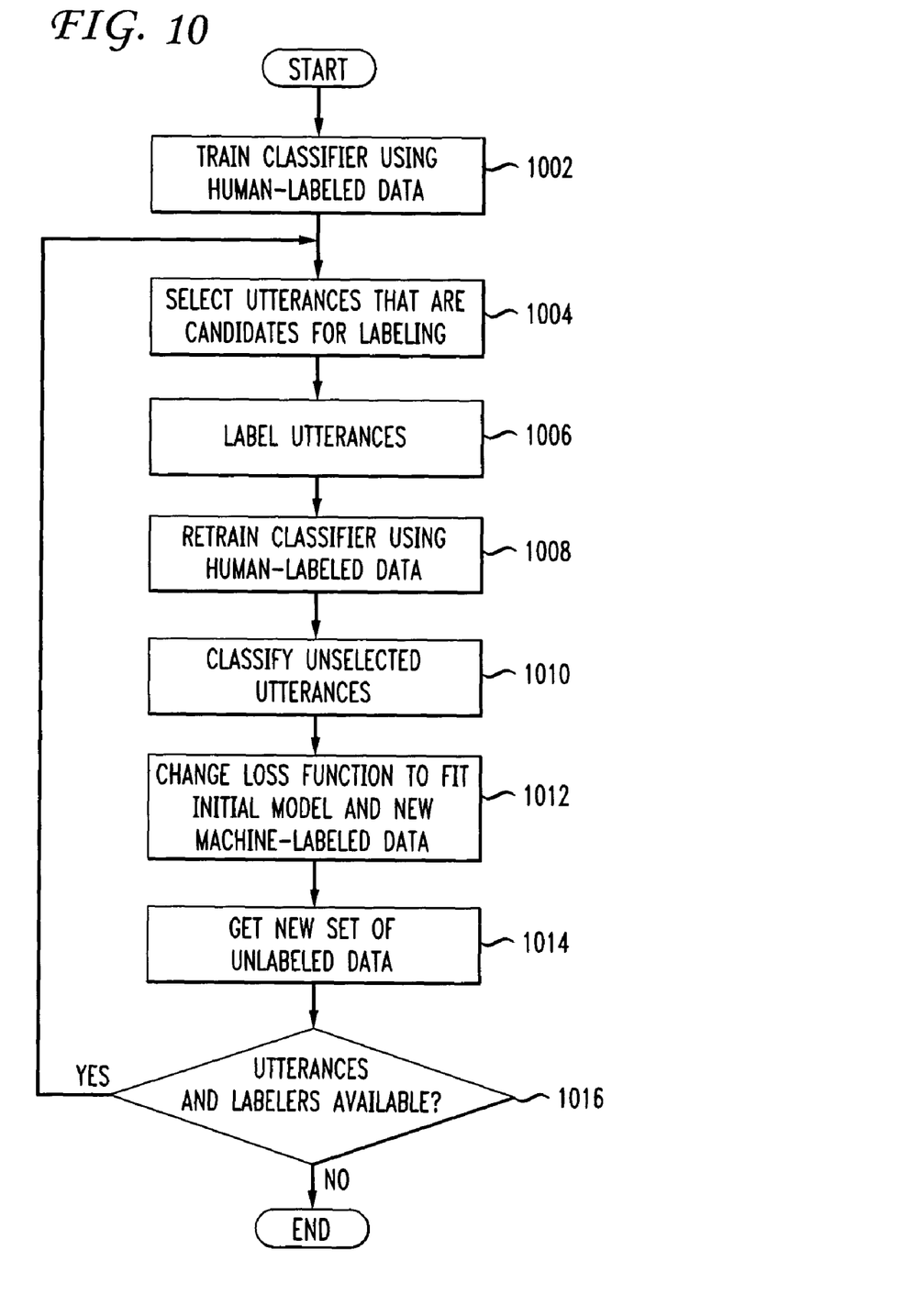

FIG. 10 is a flowchart that illustrates another specific exemplary process that may be used as an alternative to the processes of FIG. 8 or FIG. 9 in implementations consistent with the principles of the invention. First, a classifier may be trained using human-labeled utterance data (act 1002). Next, utterances may be selected as candidates for labeling (act 1004). The selected utterances may have a confidence score less that a threshold, $th_1$. The selected utterances may then be manually transcribed and labeled (act 1006). The classifier may then be retrained using the human-labeled data (act 1006). Unselected utterances may then be classified by the classifier (act 1010). The loss function may be changed to fit the initial model and the new machine-labeled data (act 1012). A new set of unlabeled data may be obtained (act 1014) and a check may be performed to determined whether any unlabeled utterances are available and whether any labelers are available (act 1016). If so, then acts 1004-1016 may be performed again. Otherwise, the process may be completed.

Semi-supervised learning techniques may only choose utterances which are classified with confidence scores higher than or equal to some threshold. Therefore, it is expected that well-represented or easy-to-classify call-types may dominate the automatically labeled data. This may produce the opposite effect of active learning, which may trim mostly such call-types. The combination of active learning and semi-supervised learning methods may alleviate the data imbalance problem due to each of the learning methods.

CONCLUSIONS

Active and semi-supervised learning algorithms for a spoken language understanding system, in this case a call classifier, were presented. First, inspired by certainty-based active learning approaches, candidate utterances, with respect to the confidence score of the call classifier, may be selectively sampled. Using semi-supervised learning methods, the utterances, which were confidently classified by the classifier, were exploited.

By combining active and semi-supervised learning, it is possible to speed up the learning rate of the classifier with respect to the amount of labeled utterances. Experiments have confirmed that the same call classification accuracy may be achieved by using less than half of the labeled data.

Many active learning techniques and semi-supervised learning techniques are well known. Implementations of the invention are not limited to only the active and semi-supervised techniques disclosed in this specification, but may be used with any active and sem-supervised learning techniques. Further, it is clear that the active and semi-supervised learning methods may be easily applicable to other statistical SLU or classification tasks such as named entity extraction, part-of-speech tagging or text categorization.

Considering the domain of spoken dialog systems, it is also possible to use information other than classification confidence scores for active and semi-supervised learning. This may include dialog level features, such as the previous prompt played or the previous call-type, or customer related features, such as location or account features.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such acts.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. For example, variations of the exemplary processes of FIGS. 4-10 may be used in some implementations consistent with the principles of the invention. Variations may include changing the order of acts or, for example, training the classifier using training data, upon each iteration of the processes of FIGS. 7-10. Accordingly, the appended claims and their legal equivalents should only define the invention, rather than any specific examples given.

We claim as our invention:

1. A method for training a spoken language understanding model classifier, the method comprising:
    training via a processor of a computing device a spoken language understanding model classifier with human-labeled utterance data to obtain an initial model;
    with the classifier, labeling utterance data from a stream of incoming data according to call type, to obtain classifier-labeled utterance data;
    with the classifier, selecting via active learning from labeled utterance data of the stream of incoming data, candidate utterance data for manual labeling based on a first threshold for active learning, to obtain selected manually-labeled utterance data; and
    changing the classifier, via semi-supervised learning, by changing a loss function to fit the initial model and the classifier-labeled utterance data, wherein changing the classifier comprises training the classifier during semi-supervised learning with the selected manually-labeled utterance data.

2. The method of claim 1, further comprising:
    retraining the classifier with updated manually-labeled utterance data; and
    classifying unlabeled ones of the utterance data.

3. The method of claim 1, wherein the loss function includes an exponential loss function.

4. The method of claim 1, wherein the loss function includes a logistic loss function.

5. The method of claim 1, wherein changing the classifier further causes the computing device to perform steps comprising:
    training the classifier using augmented data.

6. The method of claim 5, wherein training the classifier using augmented data further comprises:
    classifying ones of the unlabeled utterance data to obtain a confidence score for each one of the unlabeled utterance data; and
    selecting ones of the classified ones of the unlabeled utterance data having a corresponding confidence score greater than or equal to a threshold to form the augmented data.

7. The method of claim 1, wherein selecting via active learning further comprises:
    classifying unlabeled ones of the utterance data via the classifier; and
    selecting ones of the classified utterance data based on a score assigned by the classifier.

8. The method of claim 7, wherein selecting ones of the classified utterance data based on a score assigned by the classifier further comprises:
    selecting ones of the classified utterance data having a confidence score, assigned by the classifier, being less than a threshold.

9. A non-transitory machine-readable storage medium, having recorded therein, instructions for at least one processor, the instructions comprising:
    a first set of instructions for training a classifier with human-labeled utterance data to obtain an initial model;
    a second set of instructions causing the classifier to label utterance data from a stream of incoming data according to call type, to obtain classifier-labeled utterance data;
    a third set of instructions causing the classifier to select via active learning from labeled utterance data of the stream of incoming data, candidate utterance data for manual labeling based on a first threshold for active learning, to obtain selected manually-labeled utterance data;
    a fourth set of instructions for selecting, via active learning, ones of a plurality of unselected unlabeled utterance data for manual labeling; and
    a fifth set of instructions for changing the classifier, via semi-supervised learning, by changing a loss function to fit the initial model and the classifier-labeled utterance data, wherein changing the classifier comprises training the classifier during semi-supervised learning with the selected manually-labeled utterance data.

10. The machine-readable storage medium of claim 9, further comprising:
    a sixth set of instructions for retraining the classifier with updated human-labeled utterance data; and
    a seventh set of instructions for classifying unlabeled ones of the utterance data.

11. The machine-readable storage medium of claim 9, wherein the loss function includes an exponential loss function.

12. The machine-readable storage medium of claim 9, wherein the loss function includes a logistic loss function.

13. The machine-readable storage medium of claim 9, wherein the fifth set of instructions further comprises:
    a sixth set of instructions for training the classifier using augmented data.

14. The machine-readable storage medium of claim 13, wherein the sixth set of instructions further comprises:
    classifying unlabeled ones of the utterance data to obtain a confidence score for each one of the unlabeled utterance data; and
    selecting ones of the classified utterance data having a corresponding confidence score greater than or equal to a threshold to form the augmented data.

15. The machine-readable storage medium of claim 9, wherein the fourth set of instructions further comprises:
    a sixth set of instructions for classifying unlabeled ones of the utterance data; and
    a seventh set of instructions for selecting ones of the unlabeled utterance data based on a score.

16. The machine-readable storage medium of claim 15, wherein the seventh set of instructions further comprises:
    an eighth set of instructions for selecting ones of the unlabeled utterance data having a confidence score being less than a threshold.

17. A system comprising:
    at least one processor;
    machine-readable storage media to hold a plurality of instructions and data for use by the at least one processor, wherein the at least one processor:
        trains a spoken language understanding model with human-labeled utterance data;
        labels utterance data from a stream of incoming data according to call type, to obtain classifier-labeled utterance data;

selects via active learning from labeled utterance data of the stream of incoming data, candidate utterance data for manual labeling based on a first threshold for active learning, to obtain selected manually-labeled utterance data; and changes the classifier, via semi-supervised learning, by changing a loss function to fit the initial model and the classifier-labeled utterance data, wherein changing the classifier comprises training the classifier during semi-supervised learning with the selected manually-labeled utterance data.

18. The system of claim 17, wherein the at least one processor:

retrains the model with updated human-labeled utterance data to produce the updated model; and classifies unlabeled ones of the utterance data.

19. The system of claim 17, wherein the loss function includes an exponential loss function.

20. The system of claim 17, wherein the loss function includes a logistic loss function.

21. The system of claim 17, wherein the at least one processor changes the model, via semi-supervised learning, to produce an updated model further comprises the at least one processor:

produces the updated model using augmented data.

22. The system of claim 21, wherein the at least one processor produces the updated model using augmented data further comprises the at least one processor:

obtains a confidence score for each one of the classified utterance data; and selects ones of the classified ones of the utterance data having a corresponding confidence score greater than or equal to a threshold to form the augmented data.

23. The system of claim 17, wherein the at least one processor:

classifies unlabeled ones of the utterance data; and selects ones of the classified utterance data based on an assigned score.

24. The system of claim 23, wherein the at least one processor further comprises the at least one processor:

selects ones of the classified utterance data having the corresponding assigned score that is less than a threshold.

25. A system comprising:

a processor;

first means for controlling the processor to train a spoken language understanding classifier with human-labeled utterance data, the spoken language understanding classifier labeling utterance data from a stream of incoming data according to call type, to obtain classifier-labeled utterance data and selecting, via active learning from labeled utterance data of the stream of incoming data, candidate utterance data for manual labeling based on a first threshold for active learning, to obtain selected manually-labeled utterance data;

second means for, via active learning, ones of a plurality of unselected utterance data for manual labeling; and third means for controlling the processor to change the classifier, via semi-supervised learning, by changing a loss function to fit the initial model and the classifier-labeled utterance data, wherein the third means controls the processor to change the classifier by controlling the processor to train the classifier during semi-supervised learning with the selected manually-labeled utterance data.

* * * * *